United States Patent
Musha et al.

(10) Patent No.: US 11,559,889 B2
(45) Date of Patent: Jan. 24, 2023

(54) SUBSTRATE TRANSPORT DEVICE AND SUBSTRATE TRANSPORTING METHOD

(71) Applicant: ULVAC, Inc., Chigasaki (JP)

(72) Inventors: Kazuhiro Musha, Chigasaki (JP); Hirofumi Minami, Chigasaki (JP); Takayuki Suzuki, Chigasaki (JP)

(73) Assignee: Ulvac, Inc., Chigasaki (JP)

( * ) Notice: Subject to any disclaimer, the term of this patent is extended or adjusted under 35 U.S.C. 154(b) by 215 days.

(21) Appl. No.: 17/067,961

(22) Filed: Oct. 12, 2020

(65) Prior Publication Data
US 2021/0107149 A1 Apr. 15, 2021

(30) Foreign Application Priority Data
Oct. 15, 2019 (JP) .............. JP2019-188732

(51) Int. Cl.
*B25J 9/16* (2006.01)
*B25J 13/08* (2006.01)
*B25J 11/00* (2006.01)

(52) U.S. Cl.
CPC ............. *B25J 9/1651* (2013.01); *B25J 9/163* (2013.01); *B25J 9/1638* (2013.01); *B25J 9/1664* (2013.01); *B25J 13/088* (2013.01); *B25J 11/0095* (2013.01)

(58) Field of Classification Search
CPC ........ B25J 9/1651; B25J 9/163; B25J 9/1664; B25J 13/088; B25J 9/1679; B25J 9/1694; B25J 11/0095; B25J 15/0014; B25J 9/1638; B25J 18/04; G05B 19/0426; G05B 2219/39527; H01L 21/67742; H01L 21/67259; H01L 21/68707
See application file for complete search history.

(56) References Cited

U.S. PATENT DOCUMENTS

| | | | |
|---|---|---|---|
| 2001/0047225 A1* | 11/2001 | Shimoike | G05B 19/41815 700/250 |
| 2003/0083783 A1 | 5/2003 | Matsuo et al. | |
| 2014/0241836 A1 | 8/2014 | Kondoh | |
| 2015/0179491 A1 | 6/2015 | Katsuda et al. | |
| 2017/0170050 A1 | 6/2017 | Yoshida et al. | |
| 2018/0015620 A1* | 1/2018 | Nakaya | B25J 19/063 |
| 2021/0101281 A1* | 4/2021 | Musha | B25J 9/163 |

FOREIGN PATENT DOCUMENTS

| | | | |
|---|---|---|---|
| CN | 108604563 A | 9/2018 | |
| JP | 2015-119070 A | 6/2015 | |
| TW | 200832599 A * | 8/2008 | B25J 9/1638 |

* cited by examiner

Primary Examiner — Ian Jen
Assistant Examiner — Karston G. Evans
(74) Attorney, Agent, or Firm — Caesar Rivise, PC

(57) ABSTRACT

A substrate transport device includes an arm, an end effector coupled to the arm, a driver configured to lift the arm so that the end effector receives a substrate, and a controller configured to control an output of the driver to set a lifting speed of the arm. A difference in height between the end effector and the arm is a position difference. A period from when the end effector contacts the substrate until the end effector completes reception of the substrate is a transition period. The controller sets an upper limit value of the lifting speed that decreases an amplitude of one of acceleration or jerk of the position difference in the transition period as compared to before the transition period to an upper limit value of the lifting speed for the transition period.

7 Claims, 4 Drawing Sheets

(Prior Art)

SUBSTRATE TRANSPORT DEVICE AND SUBSTRATE TRANSPORTING METHOD

BACKGROUND

1. Field

The following description relates to a substrate transport device and a substrate transporting method.

2. Description of Related Art

An apparatus that manufactures various devices such as semiconductor elements or light emitting elements includes a substrate transport device that transports a substrate used to form the elements. The substrate transport device includes an end effector supported by an arm. The end effector lifts together with the arm and receives a substrate from a mount table or the like on which the substrate is mounted. The end effector lowers together with the arm and delivers the substrate, which is mounted on the end effector, to the mount table. The substrate transport device includes a detector that optically detects a mount state of the substrate. A controller configured to control the driving of the arm executes subsequent processes based on detection results of the detector (refer to Japanese Laid-Open Patent Publication No. 2015-119070).

SUMMARY

An increase in the moving speed of the end effector reduces the time taken for the transportation but destabilizes the position of the substrate during the transportation. On the other hand, a decrease in the moving speed of the end effector stabilizes the position of the substrate during the transportation but increases the time taken for the transportation. There is a need for the substrate transport device that transports a substrate at more appropriate speeds to obtain a favorable position accuracy of the substrate and a favorable transportation efficiency of the substrate. In particular, a period from when the end effector contacts the substrate until the end effector competes reception of the substrate is a transition period, in which a structure that supports the substrate changes from the mount table to the end effector. During the transition period, a difference in relative position between the end effector and the substrate is likely to occur as compared to during a period in which the end effector and substrate move as if an integrated body. Hence, there is a strong need to obtain a more appropriate transportation speed.

It is an objective of the present disclosure to provide a substrate transport device and a substrate transporting method that improve the position accuracy of a substrate while limiting decreases in the transportation efficiency of the substrate.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An embodiment of a substrate transport device includes an arm, an end effector coupled to the arm, a driver configured to lift the arm so that the end effector receives a substrate, and a controller configured to control an output of the driver to set a lifting speed of the arm. A difference in height between the end effector and the arm is a position difference. A period from when the end effector contacts the substrate until the end effector completes reception of the substrate is a transition period. The controller sets an upper limit value of the lifting speed that decreases an amplitude of one of acceleration or jerk of the position difference in the transition period as compared to before the transition period to an upper limit value of the lifting speed for the transition period.

An embodiment of a substrate transporting method includes setting a lifting speed of an arm coupled to an end effector, and lifting the arm at the set lifting speed to lift the end effector toward a substrate so that the end effector receives the substrate. A difference in height between the end effector and the arm is a position difference. A period from when the end effector contacts the substrate until the end effector completes reception of the substrate is a transition period. In the setting a lifting speed, an upper limit value of the lifting speed that decreases an amplitude of one of acceleration or jerk of the position difference in the transition period as compared to before the transition period is set to an upper limit value of the lifting speed for the transition period.

During lifting, the end effector continuously demonstrates a unique micro oscillation in a structural body including the end effector and the arm. When the end effector that is lifting contacts the substrate, the weight of the substrate acts on the end effector, so that the end effector and the arm are bent in accordance with the rigidity of the end effector and the rigidity of the arm. At this time, if the lifting speed of the end effector is too high, the bending of the end effector may be increased and a bounce of the substrate may be increased, so that the end effector becomes separated from the substrate. As a result, the end effector and the substrate repeatedly come into strong contact with each other. Such repeated contact of the end effector with the substrate causes a significant decrease in the position accuracy of the substrate.

When the end effector contacts the substrate at a lifting speed that may not increase the bending of the end effector and the bounce of the substrate as described above, the weight of the substrate acts on the end effector and temporarily stabilizes the micro oscillation at the end effector. That is, the micro oscillation at the end effector temporarily stabilizes as compared to the micro oscillation at the arm. Such limitation of the micro oscillation at the end effector appears as limitation of acceleration or jerk of the position difference, that is, the difference in height between the end effector and the arm.

In this regard, in each configuration described above, a period from when the end effector contacts the substrate until the end effector receives the substrate is referred to as the transition period, and the upper limit value of the lifting speed is determined so that the amplitude of one of acceleration or jerk of the position difference is smaller in the transition period than before the transition period. Thus, an increase in the bending of the end effector and an increase in the bounce of the substrate are limited in the transition period. This ultimately limits decreases in the position accuracy of the substrate that are caused by an increase in the bending of the end effector and an increase in the bounce of the substrate.

As a result, while limiting decreases in the transportation efficiency of the substrate by increasing the lifting speed for the transition period within the range that is less than or equal to the upper limit value, the position accuracy of the substrate is improved by limiting the lifting speed for the transition period to the upper limit value or lower.

In the substrate transport device described above, the controller may decrease the lifting speed in the transition period as compared to before the transition period so that the amplitude is less in the transition period than before the transition period.

The substrate transport device described above increases the lifting speed before the transition period as compared to the lifting speed in the transition period while limiting the lifting speed for the transition period to the upper limit value or lower. Thus, decreases in the transportation efficiency are more effectively limited.

In the substrate transport device described above, the controller may set the lifting speed for the transition period to be less than or equal to the upper limit value so that an amplitude of one of acceleration or jerk of the position difference is greater after the transition period than in the transition period.

The lifting of the end effector by the arm causes a micro oscillation of the end effector in the vertical direction. When the end effector contacts the substrate, the micro oscillation temporarily stabilizes. When the substrate becomes static relative to the end effector, the micro oscillation again starts to be generated in which the end effector and the substrate act as oscillators. That is, as if the end effector is integrated with the substrate, the micro oscillation of the end effector restarts.

At this point, in the substrate transport device described above, the lifting speed for the transition period is set so that the amplitude of one of acceleration or jerk of the position difference is greater after the transition period than in the transition period. Thus, the substrate will not be received at a lifting speed that hinders the substrate from becoming static relative to the end effector. This ultimately limits decreases in the position accuracy of the substrate that are caused by the received substrate being hindered from becoming static relative to the end effector. As a result, the position accuracy of the substrate is more effectively improved.

In the substrate transport device described above, the controller may increase the lifting speed after the transition period so that the amplitude is greater after the transition period than in the transition period.

The substrate transport device described above increases the lifting speed after the transition period as compared to the lifting speed in the transition period while limiting the lifting speed for the transition period to the upper limit value or lower. Thus, decreases in the transportation efficiency are more effectively limited.

In the substrate transport device described above may further include a first amplitude detector configured to detect the amplitude. The controller may execute a teaching process that repeats lifting of the end effecter at multiple of the lifting speeds that differ from one another and teaches the upper limit value of the lifting speed for the transition period is a highest one of the lifting speeds that satisfy a speed range in which a detection result of the first amplitude detector is less in the transition period than before the transition period.

The substrate transport device described above determines the upper limit value of the lifting speed based on the detection result of the first amplitude detector. Thus, the upper limit value reflects variations of micro oscillations caused by individual differences of the substrate transport device. The effectiveness of including the upper limit value of the lifting speed to improve the position accuracy is further increased.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A substrate transport device and a substrate transporting method will be described below with reference to FIGS. 1 to 6.

Figure 1:
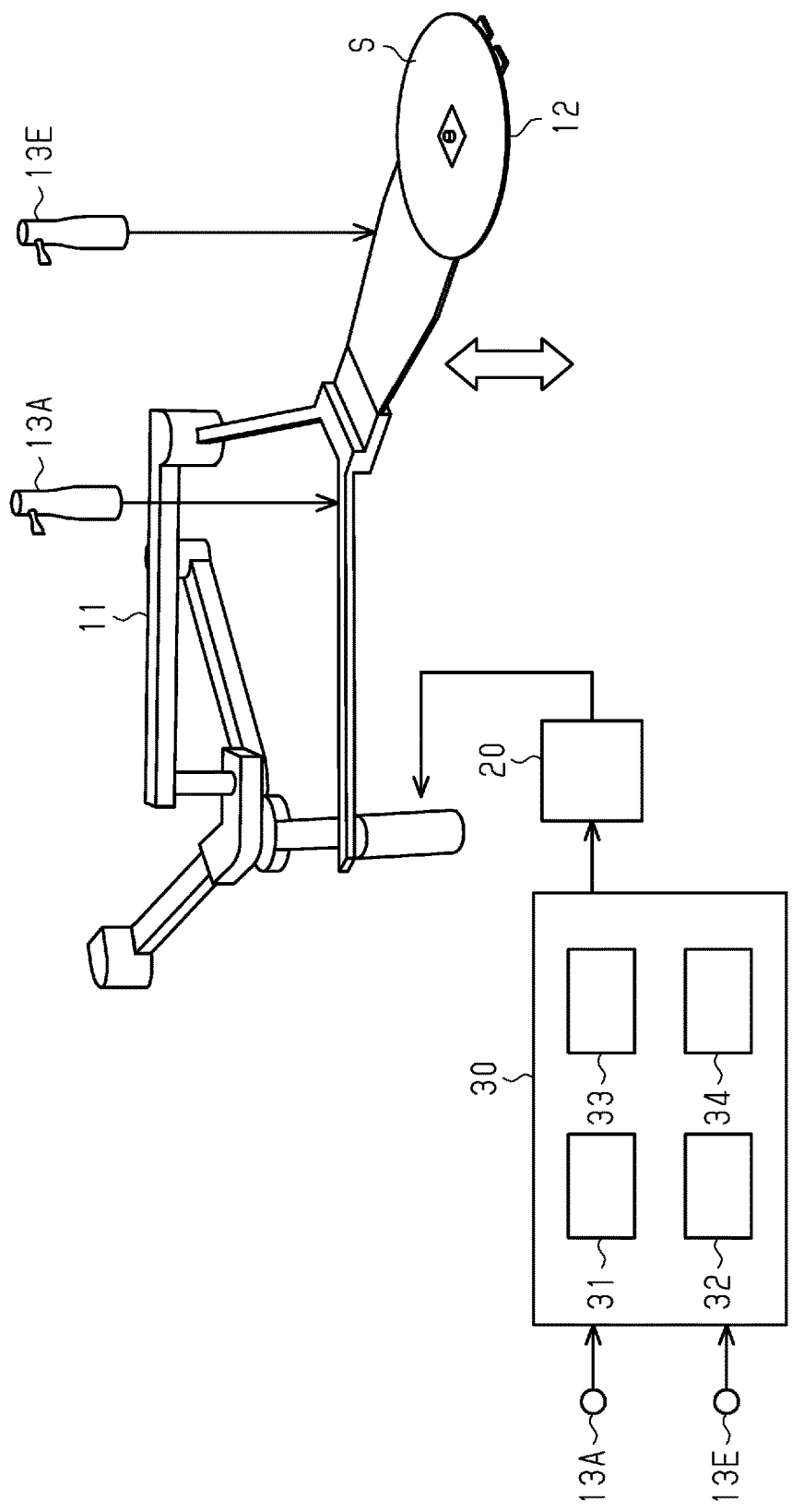
FIG. 1 is a diagram showing a device configuration of an embodiment of a substrate transport device.

As shown in FIG. 1, a substrate transport device includes an arm 11, an end effector 12, an effector sensor 13E, an arm sensor 13A, a driver 20, and a control device 30.

The arm 11 is mounted on and supported by a main body so that the arm 11 is configured to lift and lower relative to the main body and to rotate and extend and contract in a horizontal direction. The end effector 12 is configured so that a substrate S, or a transport subject, is mounted on the end effector 12. The substrate S is mounted on a mount such as a stage or a front opening unified pod (FOUP). The substrate transport device lowers the arm 11 to deliver the substrate S from the end effector 12 to the mount. The substrate transport device lifts the arm 11 so that the end effector 12 receives the substrate S from the mount.

The effector sensor 13E optically detects the height position of the end effector 12. The effector sensor 13E inputs the detected height position of the end effector 12 to the control device 30. The arm sensor 13A optically detects the height position of the arm 11. The arm sensor 13A inputs the detected height position of the arm 11 to the control device 30.

The control device 30 controls outputs of the driver 20 to control the lifting and lowering, the rotation, and the extension and contraction of the arm 11. The control device 30 controls movement of the arm 11 based on teaching data stored in advance. The driver 20 lifts and lowers, rotates, and extends and contracts the arm 11 so that the end effector 12 receives the substrate S from the mount or the substrate S is delivered from the end effector 12 to the mount in accordance with instructions of the control device 30.

The control device 30 includes a controller 31, storage 32, a transporting processor 33, and a teaching processor 34. The controller 31 includes, for example, software and hardware elements that are used in a computer such as CPU, RAM, and ROM. The controller 31 is not limited to one that processes all of the various processes using the software. The controller 31 may include, for example, an application specific integrated circuit (ASIC) that is dedicated hardware that executes at least some of the various processes. The controller 31 may include circuitry that includes one or more dedicated hardware circuits such as ASICs, one or more microcomputers that are processors operating in accordance with software, that is, computer programs, or a combination of these.

The storage 32 stores a transportation program and various types of data including the teaching data. The controller 31 reads the transportation program and the data stored in the storage 32 and executes the transportation program so that the transporting processor 33 and the teaching processor 34 execute various processes such as a transportation process and a teaching process.

The transporting processor 33 generates a drive signal that causes the arm 11 to lift or lower, rotate, and extend or contract based on the teaching data and outputs the generated drive signal to the driver 20. Teaching data used in the lifting and lowering associates the height position of the arm 11 with the lifting speed of the arm 11.

Figure 2:
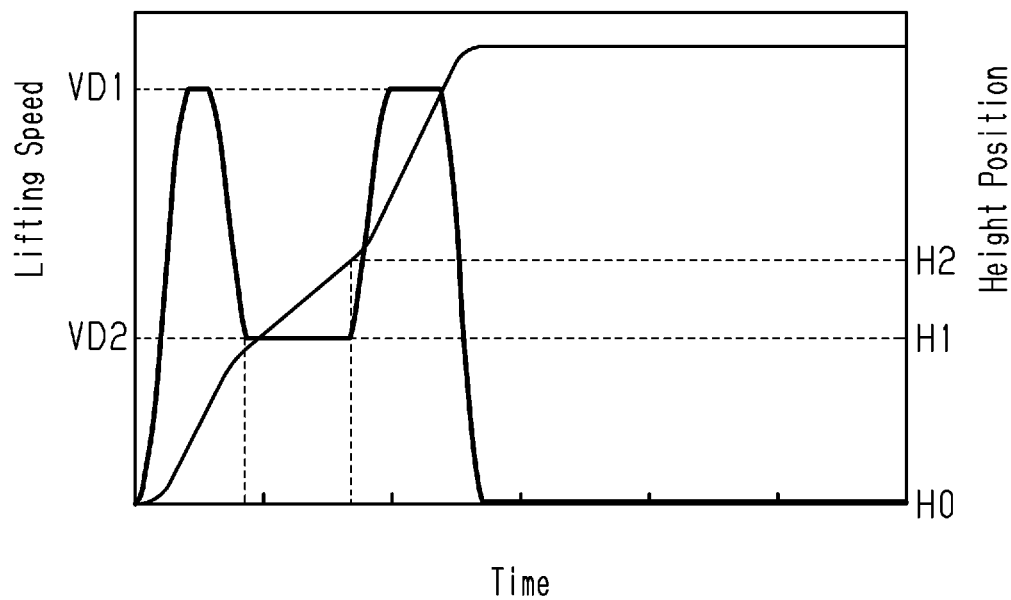
FIG. 2 is a graph showing changes in lifting speed and height position.

As shown in FIG. 2, the teaching data includes a control parameter used to increase the lifting speed to a first speed VD1 at a predetermined acceleration from when the height position of the arm 11 is a reference position H0 prior to the lifting. The teaching data also includes data used to decrease the lifting speed to a second speed VD2 when the height position of the arm 11 reaches a first target position H1. The teaching data also includes a control parameter used to increase the lifting speed from the second speed VD2 toward the first speed VD1 when the height position of the arm 11 reaches a second target position H2.

The first target position H1 is a height position of the arm 11 at which the end effector 12 contacts the substrate S. The second target position H2 is a height position of the arm 11 at which the end effector 12 completes reception of the substrate S, and is higher than the first target position H1. The second target position H2 is, for example, a height position of the arm 11 at which an oscillation changes at the end effector 12. More specifically, the second target position H2 is, for example, a height position of the arm 11 at which the oscillation changes from an oscillation in which only the end effector 12 acts as an oscillator to an oscillation in which the end effector 12 and the substrate S act as oscillators.

The transporting processor 33 drives the driver 20 based on the teaching data to decrease the lifting speed of the arm 11 from the first speed VD1 to the second speed VD2 when the arm 11 reaches the first target position H1. More specifically, while lifting the arm 11 at the first speed VD1 to lift the end effector 12 toward the substrate S, the transporting processor 33 changes the lifting speed to the second speed VD2, which is lower than the first speed VD1, when the end effector 12 contacts the substrate S.

The transporting processor 33 drives the driver 20 based on the teaching data to switch the lifting speed from the second speed VD2 to the first speed VD1 so that the speed is increased when the arm 11 reaches the second target position H2. For example, after the lifting speed is changed to the second speed VD2, when the oscillation changes at the end effector 12, the transporting processor 33 switches the lifting speed from the second speed VD2 to the first speed VD1 to increase the speed.

The teaching processor 34 teaches that the first target position H1 is a height position of the arm 11 at which the end effector 12 contacts the substrate S. Also, the teaching processor 34 teaches, for example, that the second target position H2 is a height position of the arm 11 at which the oscillation changes at the end effector 12. In addition, the teaching processor 34 executes a teaching process that determines an upper limit of the second speed VD2 (i.e., tolerance value of the second speed VD2). In the teaching process, the teaching processor 34 teaches that the upper limit value of the second speed VD2 is an upper limit value of the lifting speed of the arm 11 during a period in which the arm 11 is lifted from the first target position H1 to the second target position H2. The period in which the arm 11 moves from the first target position H1 to the second target position H2 is an example of the transition period.

In the teaching process, the teaching processor 34 uses the effector sensor 13E, which detects the height position of the end effector 12, and the arm sensor 13A, which detects the height position of the arm 11. The difference between the height position of the end effector 12 and the height position of the arm 11 is referred to as a position difference. The teaching processor 34 uses the detection value of the effector sensor 13E and the detection value of the arm sensor 13A to calculate the position difference. For example, the effector sensor 13E and the arm sensor 13A are configured to be a first amplitude detector. The effector sensor 13E and the arm sensor 13A are also configured to be a second amplitude detector. In the present example, the first amplitude detector and the second amplitude detector have the same configuration but may have different configurations (for example, different sensor groups are used in the configurations).

In the teaching process, the teaching processor 34 executes lifting of the end effector 12 toward the substrate S at multiple lifting speeds. At each lifting speed, the teaching processor 34 calculates amplitudes of jerk of the position difference before a transition period Tt, in the transition period Tt, and after the transition period Tt.

Figure 3:
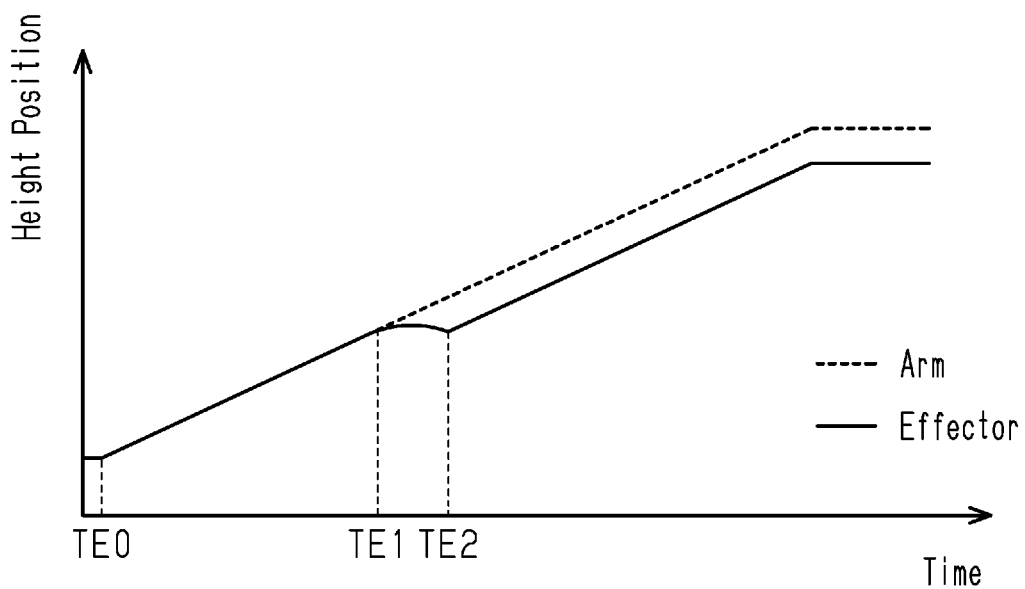
FIG. 3 is a graph showing changes in positions of an arm and an end effector during a teaching process.

FIG. 3 shows an example of changes in the height position of the arm 11 and the height position of the end effector 12 during the teaching process executed by the teaching processor 34.

As shown in FIG. 3, in the teaching process, when the teaching processor 34 lifts the arm 11 at time TE0, the end effector 12 starts to lift together with the arm 11. When the teaching processor 34 continues to lift the arm 11, the end effector 12 contacts the substrate S at time TE1. That is, the transition period Tt starts at time TE1. At this time, the weight of the substrate S acts on the end effector 12 so that the end effector 12 is bent in accordance with the rigidity of the end effector 12. In FIG. 3, this action appears in the height position in a section from time TE1 to time TE2. In this section, the height position of the end effector 12 subtly increases, and a difference between the height position of the arm 11 and the height position of the end effector 12 occurs. When the bending of the end effector 12 is stabilized, the transition period Tt ends at time TE2, and the end effector 12 again starts to lift. This is a result of the entire weight of the substrate S acting on the end effector 12. The lifting speed shown in FIG. 3 is extremely low. FIG. 3 shows a static dynamic characteristic indicating almost no amplitude.

Figure 4:
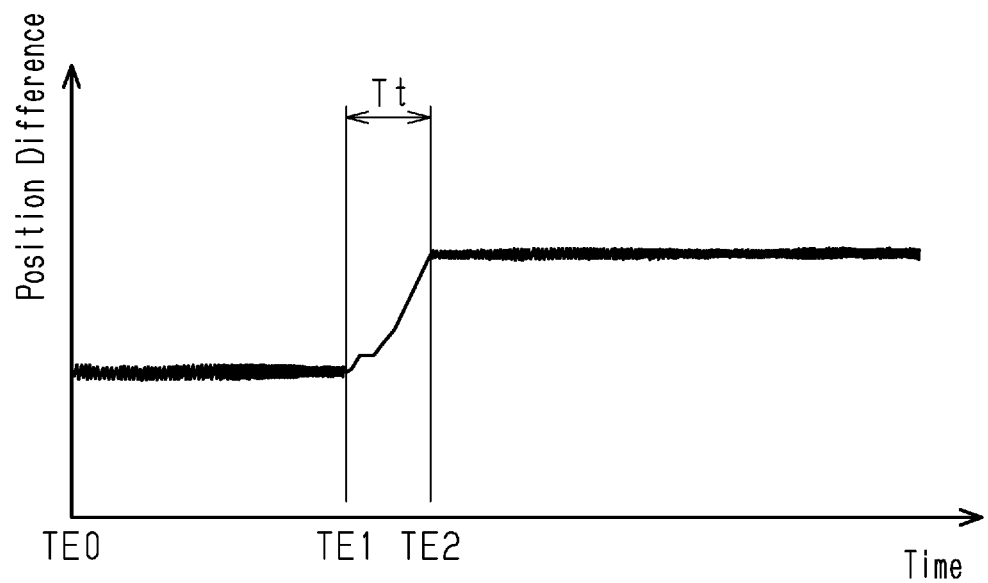
FIG. 4 is a graph showing changes in position difference during the teaching process.

FIG. 4 shows an example of changes in the position difference during the teaching process executed by the teaching processor 34. In FIG. 4, the waveform of the position difference observed before time TE1 may be referred to as an initial oscillation waveform, and the waveform of the position difference observed after time TE2 may be referred to as a residual oscillation waveform.

As shown in FIG. 4, in the teaching process, when the teaching processor 34 lifts the arm 11 at time TE0 or before time TE0, the arm 11 and the end effector 12 continuously demonstrate a unique micro oscillation in accordance with the lifting speed in the structural body including the end effector 12 and the arm 11. Since the micro oscillation of the end effector 12 differs from the micro oscillation of the arm 11, the position difference is also observed as a micro oscillation (initial oscillation waveform). That is, the position difference continues the micro oscillation before the transition period Tt.

When the teaching processor 34 lifts the arm 11 until time TE1, the end effector 12 contacts the substrate S, and the weight of the substrate S starts to act on the end effector 12. The weight of the substrate S is recognized by an offset amount in the position difference shown in FIG. 4. In other words, compliance of the end effector 12 corresponding to the weight of the substrate S is recognized as the offset amount in the position difference between before and after the transition period Tt. When this offset occurs, if the lifting speed of the end effector 12 is too high, the bending of the end effector 12 may be increased by inertia of the substrate S, and the bounce of the substrate S may be increased by elastic energy stored in the end effector 12. As a result, the end effector 12 becomes separated from the substrate S. Then, the end effector 12 and the substrate S repeatedly come into strong contact with each other. These contacts are mainly input to the end effector 12 as impacts and are observed as an amplitude, which will be described later. Therefore, the lifting speed of the end effector 12 may be variously changed so that the upper limit value of a speed range in which no impact is observed is used as the upper limit value of the lifting speed for the transition period Tt.

When the end effector 12 contacts the substrate S at a lifting speed that may not increase the bending of the end effector 12 and the bounce of the substrate S, the weight of the substrate S acts on the end effector 12 as a non-impact input, and temporary stabilization of the micro oscillation is observed at the end effector 12. This stabilization is a result of connection of the end effector 12 to the mount by the substrate S and a consequent change in the distal end of the end effector 12 from a free end to a fixed end. In other words, the stabilization is a result of a change into a model configuration that resists oscillations, that is, a change into a configuration that readily damps oscillations.

That is, in the transition period Tt, which is from time TE1 to time TE2, the oscillation of the position difference varies in accordance with the lifting speed of the arm 11. It is observed that the oscillation of the position difference tends to increase when the lifting speed of the arm 11 is relatively high, and the oscillation of the position difference tends to temporarily stabilize when the lifting speed of the arm 11 is relatively low. Therefore, among the multiple lifting speeds, the upper limit value of a speed range having the stabilization tendency may be used as the upper limit value of the lifting speed for the transition period Tt.

When the teaching processor 34 lifts the arm 11 until time TE2, the substrate S becomes static relative to the end effector 12, and the end effector 12 again starts to demonstrate a micro oscillation in which the end effector 12 and the substrate S act as oscillators. That is, the end effector 12 restarts a micro oscillation corresponding to the lifting speed as if the end effector 12 is integrated with the substrate S. Thus, the position difference is also observed as a micro oscillation (residual oscillation waveform). That is, the position difference continues the micro oscillation after the transition period Tt. An amplitude of the initial oscillation waveform and an amplitude of the residual oscillation waveform need to be within an amplitude range that does not interfere with a transportation process. Therefore, a speed at which the amplitude range is obtained is set to the lifting speed. In a preferred mode, a speed proximate to the upper limit at which the amplitude range is obtained may be set.

Figure 5:
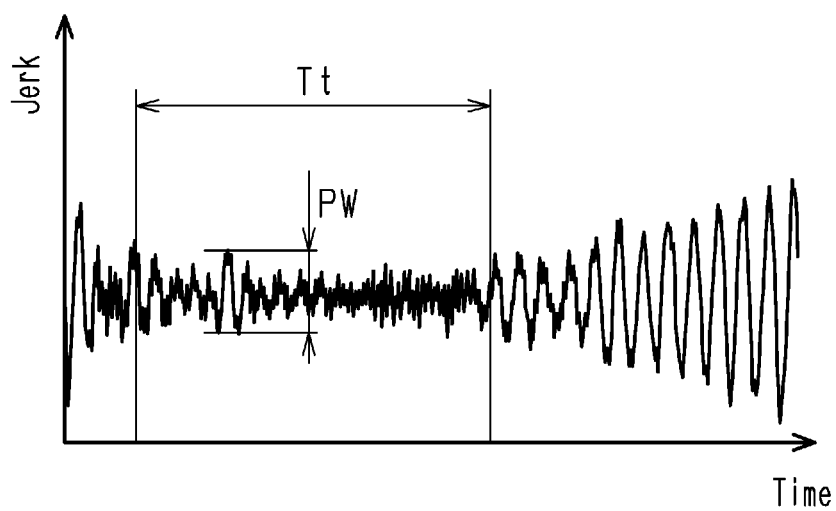
FIG. 5 is a graph showing an example of changes in jerk of the position difference during the teaching process.
Figure 6:
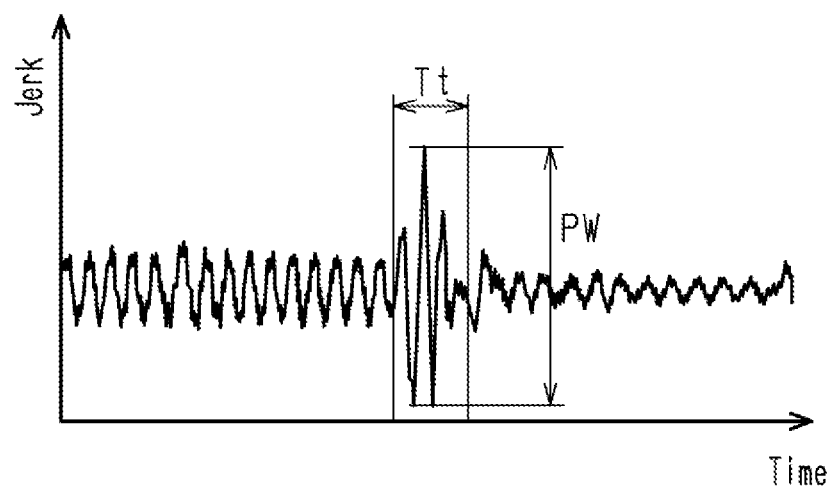
FIG. 6 is a graph showing an example of changes in jerk of a position difference during the teaching process.

FIG. 5 shows an example of changes in jerk of the position difference during the teaching process executed by the teaching processor 34 when the lifting speed is relatively low, that is, an appropriate state. FIG. 6 shows an example of changes in jerk of the position difference during the teaching process executed by the teaching processor 34 when the lifting speed is relatively high, that is, an inappropriate state.

As shown in FIG. 5, in an example in which an appropriate lifting speed is selected from the different lifting speeds, an amplitude PW of jerk of the position difference is smaller in the transition period Tt than before and after the transition period Tt. In this case, it is observed that an increase in the bending of the end effector 12 and an increase in the bounce of the substrate S are limited. In other words, amplitudes of jerk that appear before and after the transition period Tt are greater than the amplitude PW of jerk that appears in the transition period Tt. When the end effector 12 contacts the substrate S, the micro oscillation temporarily stabilizes. Then, when the substrate S becomes static relative to the end effector 12, the end effector 12 and the substrate S act as an integrated oscillator and start to again increase the amplitude of the micro oscillation.

On the other hand, as shown in FIG. 6, in an example in which an inappropriate lifting speed is selected from the different lifting speeds, the amplitude PW of jerk of the position difference is greater in the transition period Tt than before the transition period Tt or before and after the transition period Tt. In this case, the bending of the end effector 12 is increased and the bounce of the substrate S is increased. As a result, the end effector 12 becomes separated from the substrate S. It is observed that the end effector 12 and the substrate S repeatedly come into strong contact with each other. The amplitude PW shown in FIG. 6, in view of the preceding and subsequent amplitudes, is characteristic of impact-like inputs being received. Characteristically, in the transition period Tt shown in FIG. 5, damping waveforms of amplitude are observed before and after the period of the waveform having the maximum amplitude (amplitude PW), whereas in the transition period Tt shown in FIG. 6, damping waveforms of amplitude are not observed before and after the period of the waveform having the maximum amplitude (amplitude PW). That is, in the transition period Tt shown in FIG. 6, waveforms having unclear periods (damping waveforms) are not observed before and after the maximum amplitude (amplitude PW). Only a waveform having a period similar to those before the transition period Tt or a waveform having a period similar to those after the transition period Tt is observed. It is desirable that damping waveforms are formed around the maximum amplitude in the transition period Tt to stably receive the substrate S on the end effector 12 from the mount.

From the lifting speeds differing from each other, the teaching processor 34 extracts lifting speeds that satisfy a speed range in which the amplitude PW of jerk of the position difference is smaller in the transition period Tt than before the transition period Tt. The teaching processor 34 teaches that the highest one of the lifting speeds satisfying the speed range is the upper limit value of the second speed VD2. However, the teaching processor 34 may set a lifting speed that is less than or equal to the upper limit value of the speed range to the second speed VD2. After the transition period Tt, the dynamic characteristic changes depending on the type of the substrate S. Hence, it is not appropriate to use a lifting speed after the transition period Tt as an adjustment index. The amplitude PW of jerk of the position difference may be greater after the transition period Tt than in the transition period Tt. The processes of the extraction of lifting speeds and the setting of the second speed VD2 may be separate processes. In such a configuration, the teaching processor 34 may be omitted from the control device 30.

Operation

The transporting processor 33 lifts the arm 11 and the end effector 12 based on the teaching data. When the end effector 12 that is lifting contacts the substrate S, the weight of the substrate S acts on the end effector 12, so that the end effector 12 and the arm 11 are bent in accordance with the rigidity of the end effector 12 and the rigidity of the arm 11.

At this time, the upper limit value of the second speed VD2 is determined so that the amplitude PW of jerk of the position difference is smaller in the transition period Tt than before and after the transition period Tt or before the transition period Tt. That is, the arm 11 and the end effector 12 continue to be lifted so that the end effector 12 will not contact the substrate S repeatedly due to an overly high lifting speed of the end effector 12.

The embodiment has the advantages described below.

(1) The second speed VD2 is determined so that the amplitude PW of jerk of the position difference is smaller in the transition period Tt than before and after the transition period Tt or before the transition period Tt. This configuration limits an increase in the bending of the end effector 12 and an increase in the bounce of the substrate S in the transition period Tt. Thus, the oscillation is effectively damped in the transition period Tt. Accordingly, decreases in the position accuracy of the substrate S that are caused by an increase in the bending of the end effector 12 and an increase in the bounce of the substrate S are limited. At the same time, contaminations caused by the bounce of the substrate S and the like are limited.

(2) A lifting speed that is less than or equal to the upper limit value of the speed range described above is set to the second speed VD2, which is the lifting speed in the transition period Tt. This improves the position accuracy of the substrate S. In addition, when the maximum value in the speed range is set to the second speed VD2, decreases in the transportation efficiency of the substrate S are limited.

(3) The first speed VD1, which is the maximum lifting speed before the transition period Tt, maintains a value that is greater than the second speed VD2, which is the lifting speed in the transition period Tt, until immediately before the transition period Tt. Thus, decreases in the transportation efficiency are more effectively limited.

(4) The second speed VD2 may be set so that the amplitude of jerk of the position difference is greater after the transition period Tt than in the transition period Tt. When the second target position H2 is reached, the lifting speed is switched from the second speed VD2 to the first speed VD1 to increase the speed. Thus, the substrate S will not be received at the first speed VD1, which hinders the substrate S from becoming static relative to the end effector 12. This limits decreases in the position accuracy of the substrate S that are caused by the received substrate S being hindered from becoming static relative to the end effector 12. As a result, the position accuracy of the substrate S is more effectively improved.

(5) While limiting the second speed VD2 to the upper limit value or lower, the lifting speed after the transition period Tt is increased from the second speed VD2. Thus, decreases in the transportation efficiency are more effectively limited.

(6) The upper limit value of the second speed VD2 is determined based on the effector sensor 13E and the arm sensor 13A. Thus, the upper limit value reflects variations of micro oscillations caused by individual differences of the substrate transport device. Thus, the effectiveness of setting the upper limit value of the second speed VD2 to improve the position accuracy is further increased.

The embodiment may be changed as described below.

The teaching processor 34 may extract the upper limit values of lifting speeds that reduce the amplitude PW of acceleration of the position difference, instead of the amplitude PW of jerk, in the transition period Tt as compared to before the transition period Tt as candidates of the upper limit value of the second speed VD2. Then, the teaching processor 34 may set the maximum value from the candidates of the upper limit values to the upper limit value of the second speed VD2.

Among lifting speeds that increase the amplitude PW of acceleration of the position difference after the transition period Tt as compared to the transition period Tt and that are less than or equal to the upper limit value of the speed range described above, the teaching processor 34 may teach that the highest one of the lift speeds is the second speed VD2.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A substrate transport device, comprising:
an arm;
an end effector coupled to the arm;
a driver configured to lift the arm so that the end effector receives a substrate; and
a controller configured to control an output of the driver to set a lifting speed of the arm, wherein
a difference in height between the end effector and the arm is a position difference,
a period from when the end effector contacts the substrate until the end effector completes reception of the substrate is a transition period, and
the controller sets an upper limit value of the lifting speed that decreases an amplitude of one of acceleration or jerk of the position difference in the transition period as compared to before the transition period to an upper limit value of the lifting speed for the transition period.

2. The substrate transport device according to claim 1, wherein the controller decreases the lifting speed in the transition period as compared to before the transition period so that the amplitude is less in the transition period than before the transition period.

3. The substrate transport device according to claim 1, wherein the controller sets the lifting speed for the transition period to be less than or equal to the upper limit value so that an amplitude of one of acceleration or jerk of the position difference is greater after the transition period than in the transition period.

4. The substrate transport device according to claim 1, wherein the controller increases the lifting speed after the transition period so that the amplitude is greater after the transition period than in the transition period.

5. The substrate transport device according to claim 1, further comprising:
a first amplitude detector configured to detect the amplitude, wherein
the controller executes a teaching process that repeats lifting of the end effecter at multiple of the lifting speeds that differ from one another and teaches the upper limit value of the lifting speed for the transition period to be a highest one of the lifting speeds that satisfy a speed range in which a detection result of the first amplitude detector is less in the transition period than before the transition period.

6. The substrate transport device according to claim 1, further comprising:
a first amplitude detector configured to detect the amplitude, wherein
the controller executes a teaching process that repeats lifting of the end effector at multiple of the lifting speeds that differ from one another and teaches that a lifting speed for the transition period is a lifting speed that is less than or equal to an upper limit value of a speed range in which a detection result of the first amplitude detector is greater after the transition period than in the transition period.

7. A substrate transporting method, comprising:
setting a lifting speed of an arm coupled to an end effector; and
lifting the arm at the set lifting speed to lift the end effector toward a substrate so that the end effector receives the substrate, wherein
a difference in height between the end effector and the arm is a position difference,
a period from when the end effector contacts the substrate until the end effector completes reception of the substrate is a transition period, and
in the setting a lifting speed, an upper limit value of the lifting speed that decreases an amplitude of one of acceleration or jerk of the position difference in the transition period as compared to before the transition period is set to an upper limit value of the lifting speed for the transition period.

* * * * *